United States Patent [19]

Kato

[11] Patent Number: 5,185,669
[45] Date of Patent: Feb. 9, 1993

[54] STILL VIDEO CAMERA WITH WHITE BALANCE AND IMAGE PICKUP LENS ADJUSTMENT

[75] Inventor: Shinichi Kato, Tokyo, Japan

[73] Assignee: Sony Corporation, Tokyo, Japan

[21] Appl. No.: 765,982

[22] Filed: Sep. 26, 1991

[30] Foreign Application Priority Data

| Oct. 1, 1990 | [JP] | Japan | 1-263582 |
| Nov. 26, 1990 | [JP] | Japan | 1-322103 |
| Dec. 7, 1990 | [JP] | Japan | 2-407359 |
| Mar. 20, 1991 | [JP] | Japan | 1-056986 |

[51] Int. Cl.⁵ .......................................... H04N 5/232
[52] U.S. Cl. .................................... 358/227; 358/209; 358/909; 354/400
[58] Field of Search .............. 358/209, 227, 228, 909, 358/41; 354/400, 402, 403, 404; 250/201.2, 201.4, 2101.8, 205

[56] References Cited

U.S. PATENT DOCUMENTS

| 4,735,494 | 4/1988 | Makino et al. | 350/429 |
| 4,950,054 | 8/1990 | Wada | 354/400 |
| 4,991,944 | 2/1991 | Hirao et al. | 358/227 |
| 5,005,956 | 4/1991 | Kaneda et al. | 350/429 |
| 5,061,954 | 10/1991 | Toyama et al. | 354/402 |

FOREIGN PATENT DOCUMENTS

| 0343016 | 11/1989 | European Pat. Off. |
| 0352778 | 1/1990 | European Pat. Off. |
| 57-208520 | 12/1982 | Japan |
| 61-84168 | 4/1986 | Japan |
| 2194792 | 8/1990 | Japan |
| 0479671 | 4/1992 | Japan |

*Primary Examiner*—Michael T. Razavi
*Assistant Examiner*—Tuan V. Ho
*Attorney, Agent, or Firm*—Ronald P. Kananen

[57] ABSTRACT

An electronic still camera is comprised of a zoom lens for magnifying an incident optical image, a focusing lens for focusing the incident optical image, a motor for driving the focusing lens, a photo-electric converting unit for converting the optical image incident thereon through the zoom lens and the focusing lens into an electrical signal, a focus detecting circuit for detecting the focused state of the incident optical image, and a zoom lens state detecting circuit for detecting the state of the zoom lens, wherein when the movement of the zoom lens is detected by the zoom lens state detecting circuit, the focusing lens is moved by the motor so as to focus the incident optical image on the basis of the detected result of the focus detecting circuit.

4 Claims, 6 Drawing Sheets

W1 — Predetermined properly-focused position in the wide angle lens mode

T0 — Properly-focused range corresponding to w1 in the telephoto lens mode

T1 — Properly-focused position selected in the telephoto lens mode

STILL VIDEO CAMERA WITH WHITE BALANCE AND IMAGE PICKUP LENS ADJUSTMENT

BACKGROUND OF THE INVENTION

1. Field of the Invention

The present invention generally relates to an electronic still camera and, more particularly, is directed to a still video camera having a simplified arrangement in which an automatic focusing control can be carried out in a short period of time and in which a white balance can be automatically adjusted with ease in a short period of time.

2. Description of the Prior Art

A variety of so-called electronic still cameras have been developed to record a still image on a magnetic disc as an electrical video signal. This kind of electronic still camera must adjust its focus by moving a focusing ring of an image pickup lens or the like similarly to an ordinary still camera utilizing a halide film. Some of such proposed electronic still cameras employ an auto-focusing mechanism to automatically adjust the focus. According to the auto-focusing mechanism of the above conventional electronic still camera, a distance from a camera to an object is detected by some suitable method and a focusing ring of an image pickup lens is moved in accordance with the thus detected distance information; thereby, the focus is adjusted automatically.

In a video camera, a focusing information, used to execute the auto focusing control, is detected from an imager signal itself and the auto focusing control is carried out without detecting the distance from the camera to the object (see Japanese Laid-Open Patent Publication No. 57-208520). More specifically, when the focusing adjustment of the lens is appropriate, a contour of an object is picked up very clearly so that an imager signal contains a high band frequency component. When on the other hand the focusing adjustment of the lens is not proper, the contour of the object is blurred so that the imager signal does not contain the high band frequency component. For this reason, by detecting the amount of the high band component of the imager signal, it is possible to determine whether or not the present focus adjustment state is proper. Thus, the auto focus control is carried out.

Because the above-mentioned electronic still camera employs a solid state image pickup element to obtain an electrical image pickup signal similarly to the video camera, the above auto focus system in which the focusing information for carrying out the auto focusing control is detected from the imager signal itself and can be applied to the electronic still camera. If this auto focusing system is applied to the electronic still camera, then the distance from the camera to the object need not be detected, which can make the auto focusing mechanism more simplified as compared with that of the still camera utilizing the halide film.

Although power must be supplied from a battery device or the like in order for the auto focusing mechanism to move a focus adjusting lens constructing a lens device, it is requested that the power consumed to carry out the auto focus control must be reduced as much as possible in order to extend the duration of the battery device. Particularly, the still camera generally employs a smaller battery device than that of the video camera because it must be miniaturized so that, if the auto focusing control is constantly carried out similarly to the video camera, there is then the disadvantage that the duration of the battery is reduced considerably.

Further, a zoom lens is widely utilized as an image pickup lens of this kind of camera. If the zoom lens is utilized as the image pickup lens, then a focal length can be varied successively, thus making it possible to take a picture at an arbitrary angle of view from, for example, a wide angle lens to a telephoto lens.

In the case of the zoom lens, if the focal length is changed, then the focusing position also is changed. That is, if the focal length is changed under the condition such that the object is accurately just-focused before the focal length is changed without changing the distance from the camera to the object, it is frequently observed that the zoom lens cannot be focused on the object any longer. Generally in the zoom lens, in order to prevent it from becoming out of focus, a focus adjusting lens is moved bit by bit by a mechanical part such as a cam groove or the like when a focal length adjusting zoom ring is rotated, whereby the focusing position is corrected in unison with the change of the focal length; thus, the focusing position is corrected.

However, the correcting mechanism composed of mechanism parts such as a cam groove or the like for correcting the focusing position has a relatively complicated arrangement, which unavoidably makes the lens device arrangement more complicated. Also, there is then the disadvantage that the lens device (i.e., camera device) is increased in weight and in volume.

Further, if the focusing position is merely corrected, then it is to be noted that the lens device cannot be always focused accurately on the object after the focal length is adjusted. That is, if the focusing position is corrected when the lens device is not properly focused on the object prior to the adjustment of the focal length, then the lens device cannot be properly focused on the object. There is then the disadvantage that the focusing position must be adjusted in order to properly focus the lens device on the object independently of the correction of the focusing position.

Further, when the cameraman takes a picture by the above-mentioned conventional electronic still camera, the white balance must be adjusted similarly to the ordinary video camera. That is, the white balance must be adjusted in accordance with a color temperature of light which illuminates the object to be taken. The adjustment of the white balance is carried out by adjusting the levels of three primary color signals (red, green and blue color signals) constituting an imager signal. By way of example, a ratio between the levels of red color signal and of green color signal and a ratio between the levels of blue color signal and green color signal are respectively detected and the levels of the red and blue color signals are adjusted so that the above-mentioned respective ratios fall within predetermined ranges; thereby, the white balance is adjusted. Generally, the white balance is automatically adjusted as described in Japanese Laid-Open Patent Publication No. 2-194792.

In the case of the ordinary video camera, because pictures are taken successively and imager signals must be output successively, the white balance must be adjusted by constantly operating the white balance adjusting circuit so that the white balance is constantly adjusted well.

On the other hand, in the case of the electronic still camera, the cameraman takes a still picture at a desired shutter release opportunity. Therefore, it is sufficient that various characteristics such as white balance or the like are satisfactorily adjusted just before the cameraman takes a picture. Accordingly, the white balance adjusting circuit is operated only immediately before the cameraman takes a picture or only when a shutter button, for example, is half pressed, which can suppress an operation time of the white balance adjusting circuit to the minimum. As a consequence, the power consumption of the electronic still camera can be suppressed to the minimum.

However, if the white balance adjusting circuit is operated only before the cameraman takes a picture as described above, when an electronic viewfinder for color display is mounted, for example, on this electronic still camera and the object is displayed on this electronic viewfinder, an unnatural image of the object having improper white balance is continuously displayed on the electronic viewfinder until the shutter button is half pressed. Furthermore, whenever the cameraman takes a picture, the cameraman must always half press the shutter button to confirm the adjusted state of the white balance by the electronic viewfinder beforehand. As a consequence, it is troublesome for the cameraman to take a picture and the cameraman cannot take a picture readily.

OBJECTS AND SUMMARY OF THE INVENTION

Accordingly, it is an object of the present invention to provide an improved still video camera in which the aforementioned shortcomings and disadvantages encountered with the prior art can be eliminated.

More specifically, it is an object of the present invention to provide a still video camera of simple arrangement in which a focusing position can be adjusted automatically.

Another object of the present invention is to provide a still video camera having a simple arrangement in which an image pickup lens can be properly focused on an object reliably.

A further object of the present invention is to provide a still video camera with a simple arrangement in which a white balance can be adjusted automatically before the cameraman takes a picture.

As a first aspect of the present invention, an electronic still camera is comprised of a zoom lens for magnifying an incident optical image, a focusing lens for focusing the incident optical image, a motor for driving the focusing lens, a photo-electric converting unit for converting the optical image incident thereon through the zoom lens and the focusing lens into an electrical signal, a focus detecting circuit for detecting the focused state of the incident optical image, and a zoom lens state detecting circuit for detecting the state of the zoom lens, wherein when the movement of the zoom lens is detected by the zoom lens state detecting circuit, the focusing lens is moved by the motor so as to focus the incident optical image on the basis of the detected result of the focus detecting circuit.

In accordance with a second aspect of the present invention, an electronic still camera is comprised of a zoom lens for magnifying an incident optical image, a focusing lens for focusing the incident optical image, a motor for driving the focusing lens, a photo-electric converting unit for converting the optical image incident thereon through the zoom lens and the focusing lens into an electrical signal, a focus detecting circuit for detecting the focused state of the incident optical image, and a zoom lens state detecting circuit for detecting the state of the zoom lens, wherein when it is detected by the zoom lens state detecting circuit that the movement of the zoom lens is stopped, the focusing lens is moved by the motor so as to focus the incident optical image on the basis of the detected result of the focus detecting circuit.

BRIEF DESCRIPTION OF THE DRAWINGS

A better understanding of the above and other objects, features, and advantages of the present invention can be gained from the following detailed description of illustrative embodiments thereof to be read in conjunction with the accompanying drawings, in which.

DETAILED DESCRIPTION OF THE PREFERRED EMBODIMENTS

The present invention will now be described with reference to the accompanying drawings.

Figure 1:
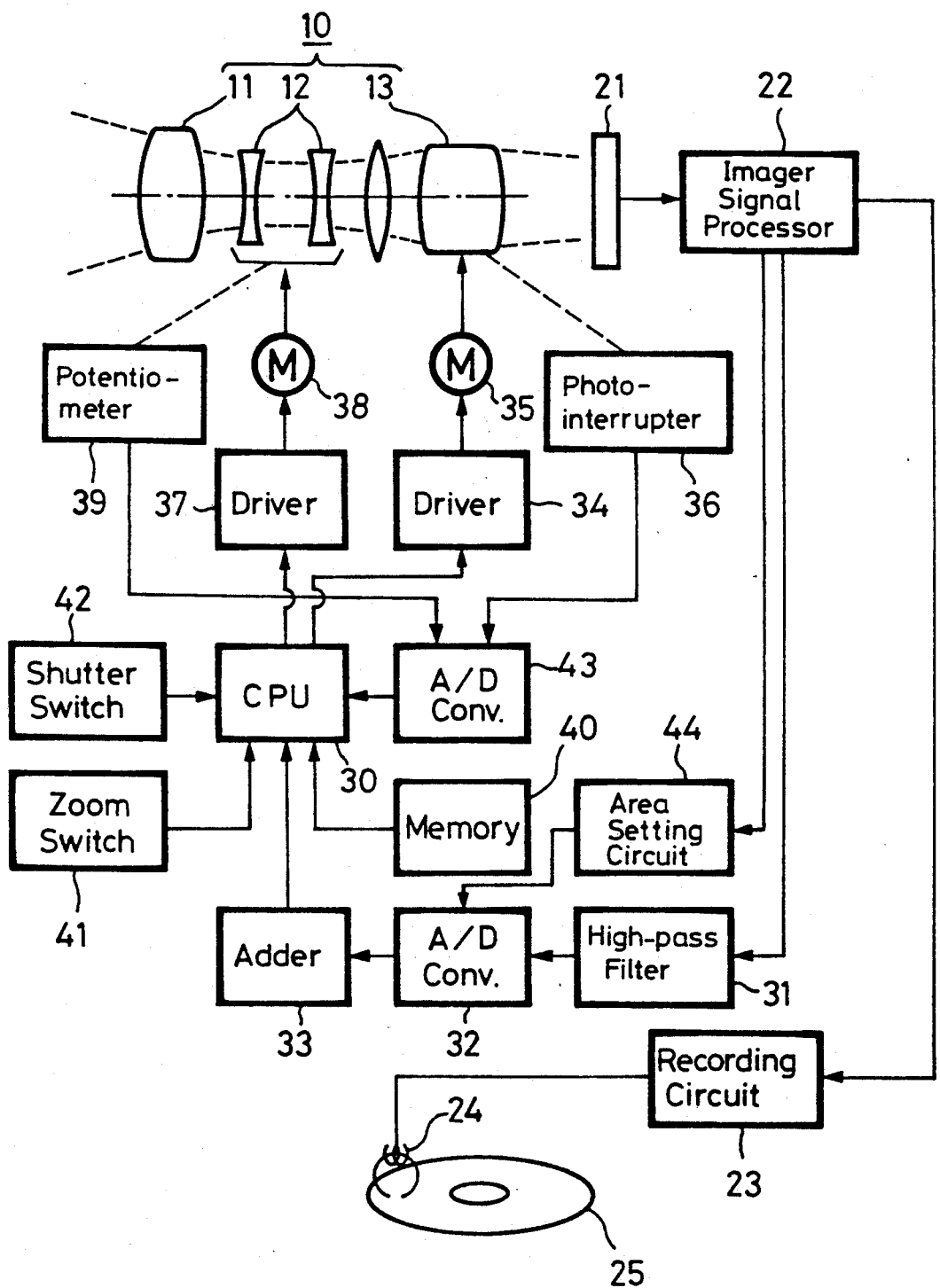
FIG. 1 is a schematic diagram showing a first embodiment of a still video camera according to the present invention.

FIG. 1 shows a first embodiment of the still video camera according to the present invention. Referring to FIG. 1, it will be seen that an image pickup lens, generally depicted by reference numeral 10, is comprised of a fixed front lens 11, a zoom lens 12 for adjusting the focal length (i.e., adjusting the angle of view) and a master lens 13 for adjusting a focus. This image pickup lens 10 is formed as a lens device of a so-called inner focus system in which the master lens 13 is located at the position nearest to the focusing screen side. In this case, the image pickup lens 10 is not provided with a mechanism which moves the master lens 13 so that the focusing position (i.e., the position at which the object is properly focused) may become constant when the focal length is adjusted by the zoom lens 12.

A light of image passed through the an image pickup lens 10 is focused on a phase plate of a solid-state image pickup element (hereinafter referred to as a CCD (charge-coupled device) imager 21 and is converted into an electrical imager signal by the CCD imager 21. The imager signal thus converted is further converted into a predetermined video signal by an imager signal processor circuit 22 and this video signal is supplied to a recording circuit 23. The video signal supplied to the recording circuit 23 is processed therein in a recording signal processing fashion and the recording video signal is supplied to a magnetic head 24 disposed in the vicinity of a magnetic disc 25, thereby a video signal of still image of one field or one frame being recorded on the magnetic disc 25.

Referring to FIG. 1, a central processing unit (CPU) 30 is shown to control the shooting condition by the camera of this embodiment. That is, it can be determined by this CPU 30 whether or not a picked-up image is properly focused. More specifically, the imager signal from the imager signal processor circuit 22 is supplied through a high-pass filter 31 to an analog-to-digital (A/D) converter 32 and only data of a predetermined area of one picture is converted into digital data by the A/D converter 32. In this case, the area (timing) in which the data of the predetermined area is converted by the A/D converter 32 is controlled by an area setting circuit 44. The area setting circuit 44 is supplied with a predetermined signal from the imager signal processor circuit 22 and determines which data of one picture the data supplied from the high-pass filter 31 to the A/D converter 32 represents. If it is determined by the area setting circuit 44 that the data represents the data of the necessary area (i.e., data indicative of the sampling area), then the area setting circuit 44 supplies a control signal to the A/D converter 32 in which analog data is converted into the digital data.

The digital data derived from the A/D converter 32 is supplied to an adding circuit 33 and data of one picture is added to the digital data by the adding circuit 33. The added value of one picture is supplied to the CPU 30.

Accordingly, one picture amount of the high band component involved in the imager signal of the predetermined area of the previously determined one picture is added to the digital data by the adding circuit 33 and the added value of the high band component of the imager signal of one picture is supplied to the CPU 30.

The CPU 30 identifies the added data supplied thereto and adjusts the focus on the basis of the identified result such that the added value of the high band component extracted by the high-pass filter 31 may be maximized. To be more concrete, the CPU 30 is adapted to control a stepping motor 35, which moves the master lens 13, through a driver circuit 34 and permits the stepping motor 35 to move the master lens 13 so that the added value of the high band component may be maximized when the focus is adjusted automatically, In this embodiment, the automatic focus adjustment is carried out under the condition that a shutter of the camera is half pressed.

When the master lens 13, which is driven by the stepping motor 35, is located at the focusing position of infinity, such position of the master lens 13 is optically detected by a photo-interrupter 36. Detected data indicating that the master lens 13 is located at the focusing position of infinity is supplied to the CPU 30 through an A/D converter 43. The position (focusing position) of the master lens 13 can be constantly determined by the number of steps in which the stepping motor 35 is driven from the position of infinity under the control of the CPU 30. The number of steps i.e., a variable range) in which the stepping motor 35 can be driven) is changed with the focal length, wherein the stepping motor 35 can be driven by 100 steps if the focal length is longest, while the stepping motor can be drive by 40 steps if the focal length is shortest.

In this embodiment, when the auto focus control is executed for the first time after the cameraman starts to take a picture, an initialize is executed and the focusing position can be judged. That is, the CPU 30 incorporates therein a lens position memory (not shown) to store position information of the master lens 13 so that, when the cameraman starts to take a picture, the master lens 13 is moved to one direction and placed at the position of infinity by driving the stepping motor 35 under the control of the CPU 30 and lens position data at that time is stored in the lens position memory.

Incidentally, the detecting position of the photo-interrupter interrupter 36 may not be limited to infinity.

When the zoom lens 12 is moved under this condition to thereby change the detection data of a potentiometer 39, which will be described later, position data indicative of the position at which the master lens 13 is expected to be placed and which data is stored in the lens position memory within the CPU 30 is updated. Then, on the basis of the thus updated data, the master lens 13 is moved by the stepping motor 35 so that the master lens 13 can be placed at the proper position.

Further, in this embodiment, the angle of view (focal length) by the zoom lens 12 is adjusted under the control of the CPU 30. That is, the CPU 30 is arranged such that it can control a motor 38 which moves the zoom lens 12 through a driver circuit 37. Accordingly, a zoom switch 41 coupled to the CPU 30 is operated, whereby the zoom lens 12 is moved by the motor 38 to adjust the focal length toward the telephoto lens side or toward the wide angle lens side. In this case, the position of the zoom lens 12 driven by the motor 38 is detected by the potentiometer 39, which is employed as a zoom lens position detecting unit, as voltage data. This detection data is supplied to the CPU 30 via the A/D converter 43, whereby the position (focal length) of the zoom lens 12 can be constantly judged by the CPU 30 side.

As shown in FIG. 1, a memory 40 coupled to the CPU 30 is a nonvolatile memory in which there are stored beforehand informations of focusing positions at which the properly-focused state can be maintained with high possibility when the focal length is changed. That is, the properly-focused state of the zoom lens 12 is changed when the focal length thereof is changed, and the information of this changed amount is stored in the nonvolatile memory 40 at every focusing position. In this embodiment, when the focal length is changed from the telephoto lens side to the wide angle lens side, the corresponding focusing position is fixed to one point and hence, the changed amount for adjusting the zoom lens to the corresponding focusing position is stored in the nonvolatile memory 40. Also, when the focal length is changed from the wide angle lens side to the telephoto lens side, then the corresponding focusing position has a width so that the changed amount for adjusting the zoom lens to the intermediate point within the corresponding focusing position of a predetermined width is stored in the nonvolatile memory 40.

Thus, when the focal length is changed by the zoom lens 12 under the condition such that a certain object is properly focused, the adjusting amount by which the object is properly focused by the master lens 13 can be detected by the information stored in the nonvolatile memory 40.

The adjusting information stored in the memory 40 is read out under the control of the CPU 30 when the focal length is changed by the zoom lens 12. At the same time when the focal length is changed, then drive control data based on the thus read-out adjusting information is supplied to the driver circuit 34 of the stepping motor 35 which drives the master lens 13, thereby moving the master lens 13 such that the focusing position (at which the properly-focused state is presented) becomes constant.

A shutter button or shutter switch, depicted by reference numeral 42 in FIG. 1, is coupled to the CPU 30. When the shutter button 42 is depressed, then the CPU 30 performs a predetermined control operation to take a picture, thereby the video signal being recorded on the magnetic disc 25. The shutter switch 42 is arranged such that three states such as when it is half pressed, when it is completely pressed and when it is not pressed can be discriminated from one another. Thus, the cameraman takes a picture under the condition that the shutter switch 42 is completely pressed. Furthermore, when the shutter switch 42 is half pressed, then the above automatic focus adjustment is carried out.

Referring to a flowchart forming FIG. 2, an example of operation highlighting the focus control when the cameraman takes a picture by the still video camera of this embodiment will be described below.

In this embodiment, the automatic focus adjustment is carried out before the cameraman takes a picture under the condition that the adjustment of the angle of view by the zoom lens 12 is finished and that the shutter switch 42 is half pressed.

Figure 2:
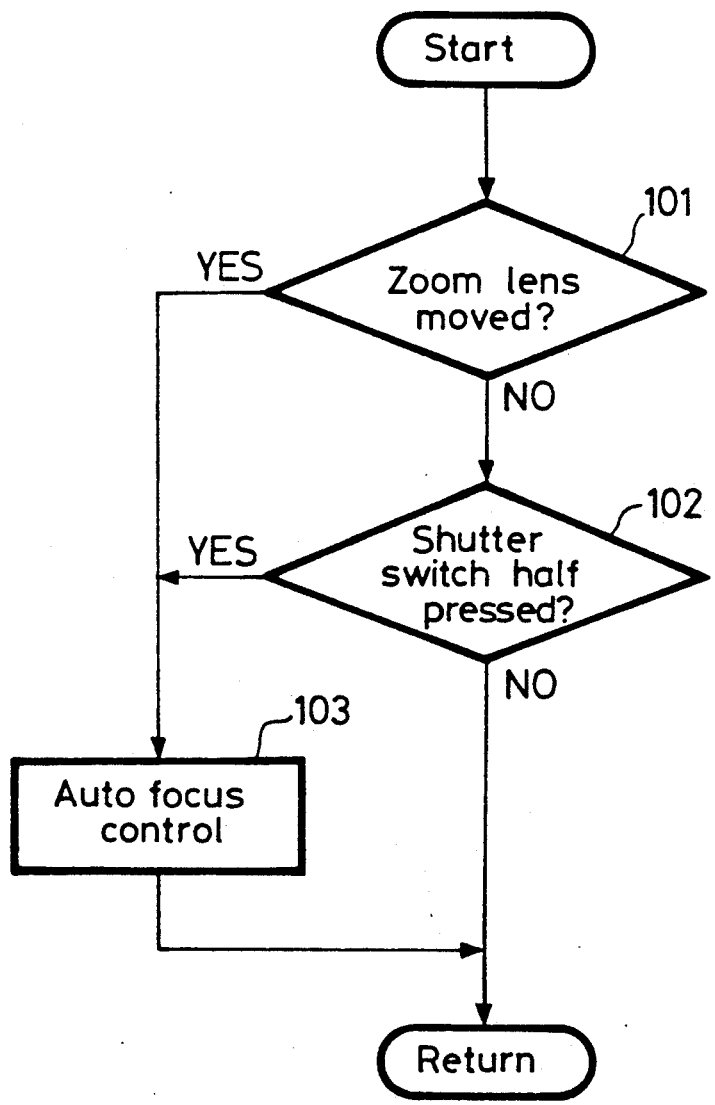
FIG. 2 is a flowchart to which references will be made in explaining focus control operation when the cameraman takes a picture by the still video camera of the present invention.

Referring to FIG. 2, following the Start of the operation, it is determined in the next decision step 101 by the CPU 30 on the basis of position data supplied from the potentiometer 39 whether or not the zoom lens 12 is moved and then stopped and whether or not the shutter switch 42 is half pressed. If a NO is output at decision step 101, then the processing proceeds to the next decision step 102. It is determined in decision step 102 whether or not the shutter switch 42 is half pressed. If a NO is output at decision step 102, then the processing is ended. If it is determined in decision step 101 that the zoom lens 12 is moved and then stopped or if it is determined in decision step 102 that the shutter switch 42 is half pressed, then the processing proceeds to step 103. At step 103, judging the present added value supplied thereto from the adding circuit 33 side, the CPU 30 controls the driver circuit 34 such that the driver circuit 34 drives the stepping motor 35 to move the master lens 13, whereby the master lens 13 is stopped at the position in which the added value becomes maximum, thus the properly-focused state being presented.

The position of the master lens 13 at that time is maintained when the zoom lens 12 is moved and then stopped or until the shutter switch 42 becomes half pressed, whereby a video signal obtained when the cameraman takes a picture under the condition that the shutter switch 42 is completely pressed is recorded on the magnetic disc 25.

According to the still video camera of this embodiment, since the automatic focus adjustment is carried out at a timing point in which the adjustment of the angle of view by the movement of the zoom lens 12 is finished, the focus adjustment is not carried out before the angle of view is adjusted or during the time that the angle of view is adjusted, thereby the number of the automatic focus adjustments done before the cameraman takes a picture is suppressed to the minimum. Accordingly, the power consumed for automatically adjusting the focus can be suppressed to the minimum, which can extend the life of the battery device for driving this still video camera. Furthermore, when the automatic focus adjustment is made without adjusting the angle of view, it is sufficient that the cameraman half presses the shutter switch 42. Therefore, the focus adjustment can be made with ease independently of the adjustment of the angle of view.

An example of an auto-focus apparatus which can be effectively applied to the present invention will be described with reference to also a flowchart forming FIG. 3.

In this example, similarly to the above-mentioned embodiment, the automatic focus adjustment, which is carried out before the cameraman takes a picture, is executed when the adjustment of the angle of view wherein the focal length is changed by the zoom lens 12 is ended and when the shutter switch 42 is half pressed.

Figure 3:
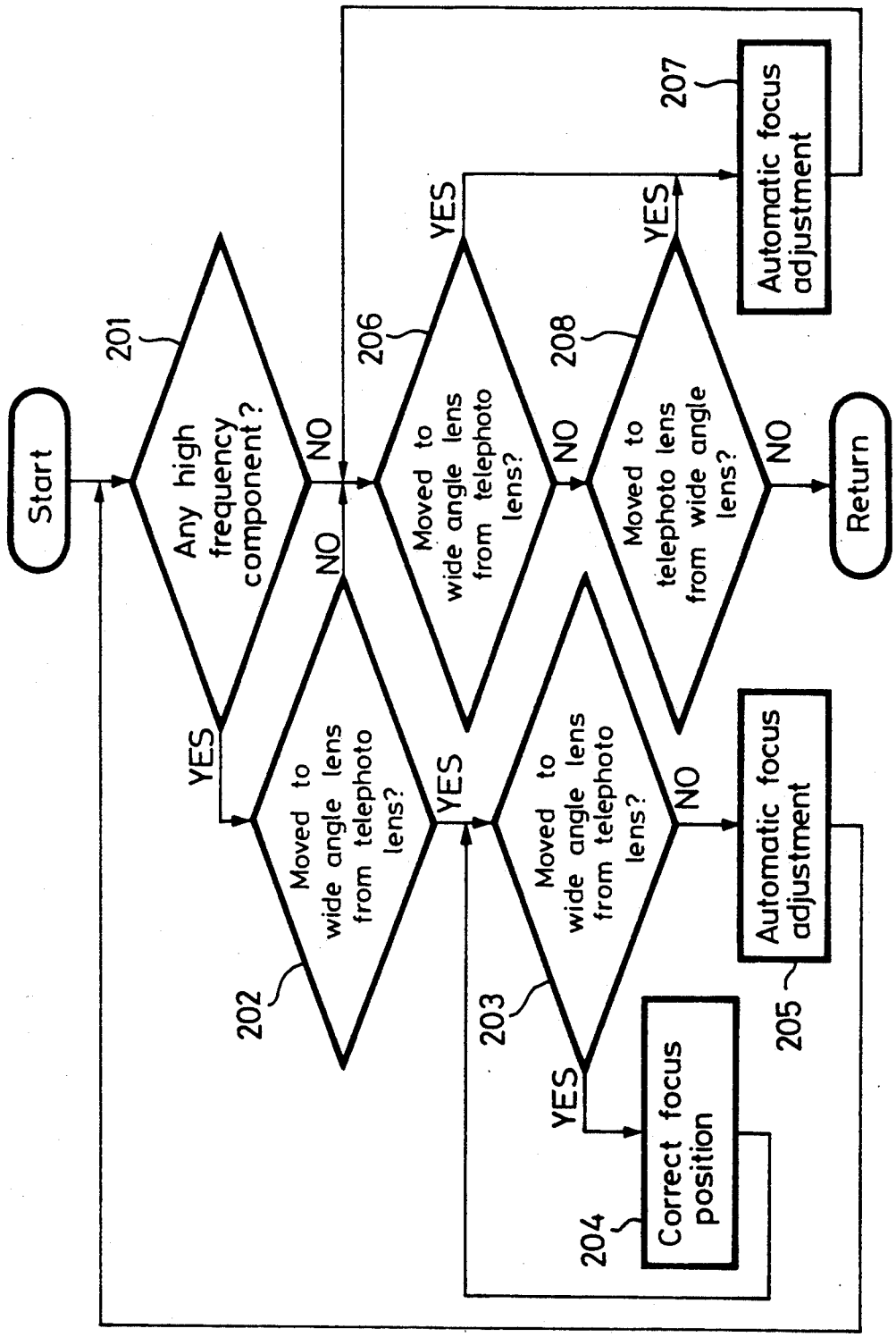
FIG. 3 is a flowchart to which references will be made in explaining automatic focus adjusting operation when the cameraman takes a picture by the still video camera of the present invention.

Referring to FIG. 3, following the Start of operation, it is determined in decision step 201 by the CPU 30 on the basis of the added value data supplied thereto through the high-pass filter 31 provided as the high frequency component detecting circuit, the A/D converter 32 and the adding circuit 33 whether or not the image pickup lens 10 properly focuses the object (not shown) at present. If a YES is output at decision step 201, then the processing proceeds to the next decision steps 202 and 203, whereat the zoom lens 12 is moved so as to reduce the focal length, i.e., the zoom lens 12 is moved from the telephoto lens side to the wide angle lens side and then stopped. If it is determined in decision steps 202 and 203 that the zoom lens 12 is moved so as to reduce the focal length and then stopped, then the processing proceeds to the next step 204, whereat the master lens 13 is moved on the basis of the adjustment information stored in the memory 40 so as to make the focusing position constant; thereby the object placed at the same position is continuously properly-focused.

After the focusing position is corrected so as to make the focusing position constant in step 204, the processing returns to decision step 203, whereat it is determined whether the angle of view is adjusted one more time from the telephoto lens side to the wide angle lens side. If it is determined in decision step 203 that the angle of view is not yet adjusted, i.e., the angle of view is not changed after the focusing position is corrected, then the processing proceeds to step 205. In step 205, while judging the added value data supplied from the adding circuit 33 side by the CPU 30, the stepping motor 35 is driven by the driver circuit 34 to move the master lens 13 and then the master lens 13 is stopped at the position in which the added value data is maximized; thereby the properly-focused state is presented.

If on the other hand it is determined in step 201 on the basis of the added value data supplied to the CPU 30 that the object is not properly focused by the image pickup lens 10, then the processing proceeds to decision step 206. In decision step 206, it is determined whether or not the zoom lens 12 is moved so as to reduce the focal length, i.e., the zoom lens 12 is moved from the telephoto lens side to the wide angle lens side and then stopped. If it is determined in decision step 206 that the zoom lens 12 is moved so as to reduce the focal length and then stopped, then the processing proceeds to the next step 207, whereat while judging the current added value data supplied from the adding circuit 33, the CPU 30 controls the driver circuit 37 so that the driver circuit 34 drives the stepping motor 35 to move the master lens 13 and then moved at the position in which the added value is maximized; thereby, the properly-focused state being presented.

If a NO is output at step 206, then the processing proceeds to the next decision step 208, whereat it is determined whether or not the zoom lens 12 is moved so as to increase the focal length and is then stopped. If it is determined in decision step 208 that the zoom lens 12 is moved so as to increase the focal length, i.e., the zoom lens 12 is moved from the wide angle lens side to the telephoto lens side and stopped, then the processing proceeds to step 207,whereat while judging the current added value data supplied from the adding circuit 33, the CPU 30 controls the driver circuit 34 so that the driver circuit 34 drives the stepping motor 35 to move the master lens 13 and then moved at the position in which the added value is maximized; thereby, the properly-focused state is presented.

If it is determined in decision step 201 that the image pickup lens 10 is not focused on the object at present and if it is determined in decision step 202 that the zoom lens 12 is not moved so as to reduce the focal length, then the processing proceeds through decision step 206 to decision step 208. In decision step 208, it is determined whether or not the zoom lens 12 is moved so as to increase the focal length and then stopped. If a YES is an answer at decision step 208, then while judging the current added value data supplied from the adding circuit 33, the CPU 30 controls the driver circuit 34 so that the driver circuit 34 drives the stepping motor 35 to move the master lens 13 and then moved at the position in which the added value is maximized, thereby the properly-focused state being presented.

In any cases, the position of the master lens 13 at that very moment is maintained until the zoom lens 12 is moved and then stopped. Thereafter, the video signal obtained when the shutter switch 42 is completely pressed is recorded on the magnetic disc 25. Thus, when the angle of view is not adjusted by the zoom lens 12, then the automatic focus adjustment is not carried out and the still video camera is set to the standby mode.

Although not shown in the flowchart of FIG. 2, the automatic focus adjustment is carried out under the control of the CPU 30 even when the shutter switch 42 is half pressed.

As described above, according to the still video camera of this embodiment, although the image pickup lens 10 is simplified in arrangement such that the focusing position is not corrected when the focal length is adjusted by the the mechanical mechanism assembly parts, the correction of the focusing position or the automatic focus adjustment is executed at timing point when the adjustment of the angle of view by the movement of the zoom lens 12 is finished. Thus, when the angle of view is adjusted by the movement of the zoom lens 12, the properly-focused state can be prevented from being broken and hence, the image pickup lens 10 can be continuously properly-focused on the object. In other words, if the image pickup lens is properly focused on the object before the angle of view is adjusted, when the angle of view is adjusted from the telephoto lens side to the wide angle lens side, a depth of field of the image pickup lens 10 (i.e., the range of properly-focused state) is widened. For this reason, if the focusing position is corrected by the amount corresponding to the change of the focal length, then the properly-focused state is continuously presented, and the correction of the focusing position is carried out, thereby the image pickup lens 10 being continuously focused on the object. If the angle of view is adjusted from the telephoto lens side to the wide angle lens side when the image pickup lens is not focused on the object before the angle of view is adjusted, then the correction of the focusing position is not carried out and the automatic focus adjustment is readily performed, thereby the image pickup lens being rapidly focused on the object. Accordingly, if the angle of view is adjusted by the zoom lens 12 when the shooting condition is monitored by, for example, the viewfinder, the user can obtain an excellent image under which the image pickup lens is readily properly-focused on the object.

Further, when the angle of view is adjusted from the wide angle lens side to the telephoto lens side, then the depth of field of the image pickup lens 10 is narrowed. Thus, only with the correction of the above focusing position, there is then the risk that the image pickup lens will become out of the range in which the properly-focused state is presented. However, also in this case, the correction of the focusing position is not carried out and the automatic focusing position is carried out immediately, thus preventing the accident in which the image pickup lens is not properly focused on the object.

In accordance with this embodiment, since the properly-focused state is presented under the control of the CPU 30 formed of the microcomputer when the focusing control is carried out, the image pickup lens 10 does not need mechanisms such as a cam groove or the like, which can make the image pickup lens 10 small in size and light in weight by the simple arrangement. Therefore, the still video camera of this invention having the image pickup lens 10 mounted thereon can be reduced in size and in weight.

Further, since the automatic focus adjustment is carried out only when the angle of view is adjusted, the number (time) in which the automatic focus adjustment is carried out before the cameraman takes a picture can be suppressed to the minimum. Accordingly, the power consumed for the automatic focus adjustment can be suppressed, which can extend the life of the battery device which drives the still video camera of this invention. Further, when the automatic focus adjustment is performed without adjusting the angle of view, it is sufficient that the cameraman half presses the shutter switch 42. Therefore, the focus adjustment can be made with ease regardless of the adjustment of the angle of view.

Figure 4:
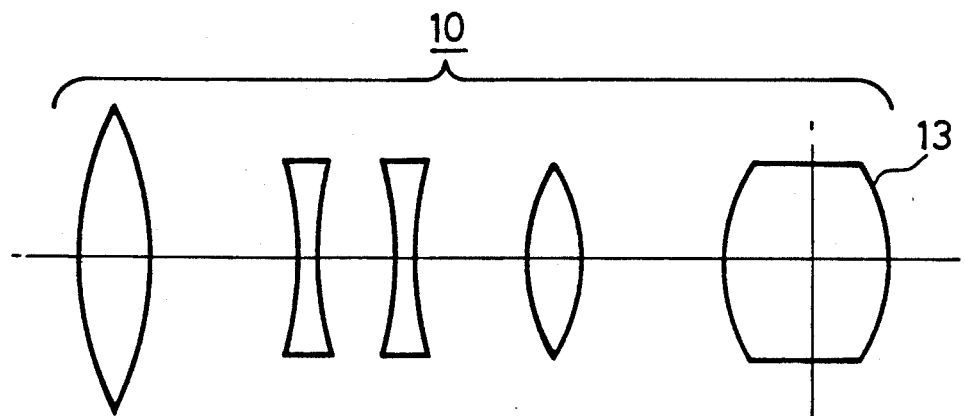
FIG. 4 is a schematic diagram showing a movable range of a master lens provided as a focusing lens, and to which references will be made in explaining the adjusted condition of the lens.
Figure 4:
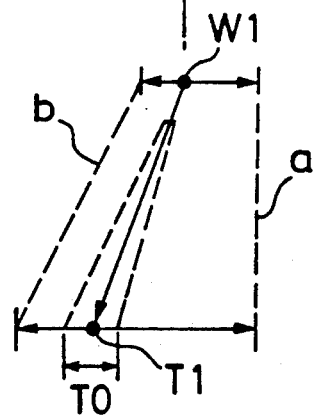

A second embodiment of the present invention will hereinafter be described with reference also to FIG. 4. FIG. 4 shows a movable range of the master lens 13 which is employed as the focusing lens. In this case, let it be assumed that the master lens 13 is placed in the properly-focused state at a predetermined position W1 when the focal length is shortest (in the wide angle lens side). When the focal length is extended to the maximum (telephoto lens side), then the properly-focused position corresponding to the properly-focused position W1 in the wide angle lens mode fall within a range T0. In this embodiment, data indicative of the changing amount in which the properly focusing position is placed at a position T1 which is the intermediate point within the properly-focusing range T0 is stored in the memory 40. On the basis of this data, the stepping motor 35 moves the master lens 13 to the position T1 under the control of the CPU 30. In this case, the stepping motor 35 moves the master lens 13 after the adjustment of the foal length by the movement of, for example, the zoom lens 12 is finished. Alternatively, the focusing position may be adjusted successively from a timing point when the adjustment of the focal length is started.

Since the properly-focusing position is adjusted at the intermediate position in the range of the properly-focused state as describe above, there is then the large possibility that the image pickup lens 10 is properly focused on the object in the best condition. There is then the possibility that the properly-focused state to the object by the image pickup lens 10 is continued.

When the focal length is changed from the long state (telephoto lens side) to the short state (wide angle lens side), the position within the range T0 of, for example, FIG. 4 is selected in the telephoto mode. Thus, when the properly-focused state is presented, then the corresponding properly-focused position in the wide angle mode is only one point W1 with the result that the master lens 13 is moved to this point W1 on the basis of the data stored in the memory 40.

In FIG. 4, a dashed line a represents the change of the position of the master lens 13 in the infinity, $\infty$ and a dashed line b represents the change of the position of the master lens 13 in the shortest range, respectively.

By the above-mentioned adjustment, when the angle of view is changed from the telephoto lens side to the wide angle lens side, then the properly-focused state to the object placed at the same position can be achieved continuously.

While the master lens 13 is adjusted in response to the angle of view, the video signal obtained when the shutter switch 42 is completely pressed is recorded on the magnetic disc 25.

According to the still video camera of this embodiment, although the image pickup lens 10 is simplified in arrangement such that the focus position is not corrected when the focal length is adjusted by the mechanical assembly parts, the angle of view is adjusted by the movement of the zoom lens 12 and simultaneously, the focusing position is properly corrected. Thus, even when the angle of view is adjusted by moving the zoom lens 12, the image pickup lens 10 can be prevented from becoming out of focus and can be properly focused on the object. In this case, since the lens device of the inner-focus type of this embodiment cannot be constructed without difficulty so as to correct the focusing position by the mechanism such as the cam groove or the like from a construction standpoint, the effect that the focusing position can be corrected by the data stored in the memory 40 is powerful.

Alternatively, after the angle of view is adjusted from the wide angle lens side to the telephoto lens side and the focusing position is adjusted to the intermediate position of the corresponding lens position, the image pickup lens 10 may be focused more reliably on the object by carrying out the automatic focusing adjustment on the basis of the detection of the added value. In this case, since the focusing position is already set to the position of very strong possibility such that the image pickup lens can be most reliably focused on the object during the focus position is adjusted to the intermediate position of the corresponding lens, the displacement from the properly-focused state is very small, if any, so long as the object is not moved. Therefore, the image pickup lens can be properly focused on the object by the very slight movement of the master lens 13, thereby the automatic focusing adjustment being carried out in a quite short period of time.

While the focusing position is adjusted to the intermediate position of the corresponding lens 13 when the angle of view is adjusted from the wide angle lens side to the telephoto lens side as described above, it is frequently observed that the properly-focused state is highly possibly presented by slightly displacing the focusing position from the above intermediate position. At that time, adjusting data for moving the focusing position from the intermediate position to the slightly displaced position may be stored in the memory 40.

Figure 5:
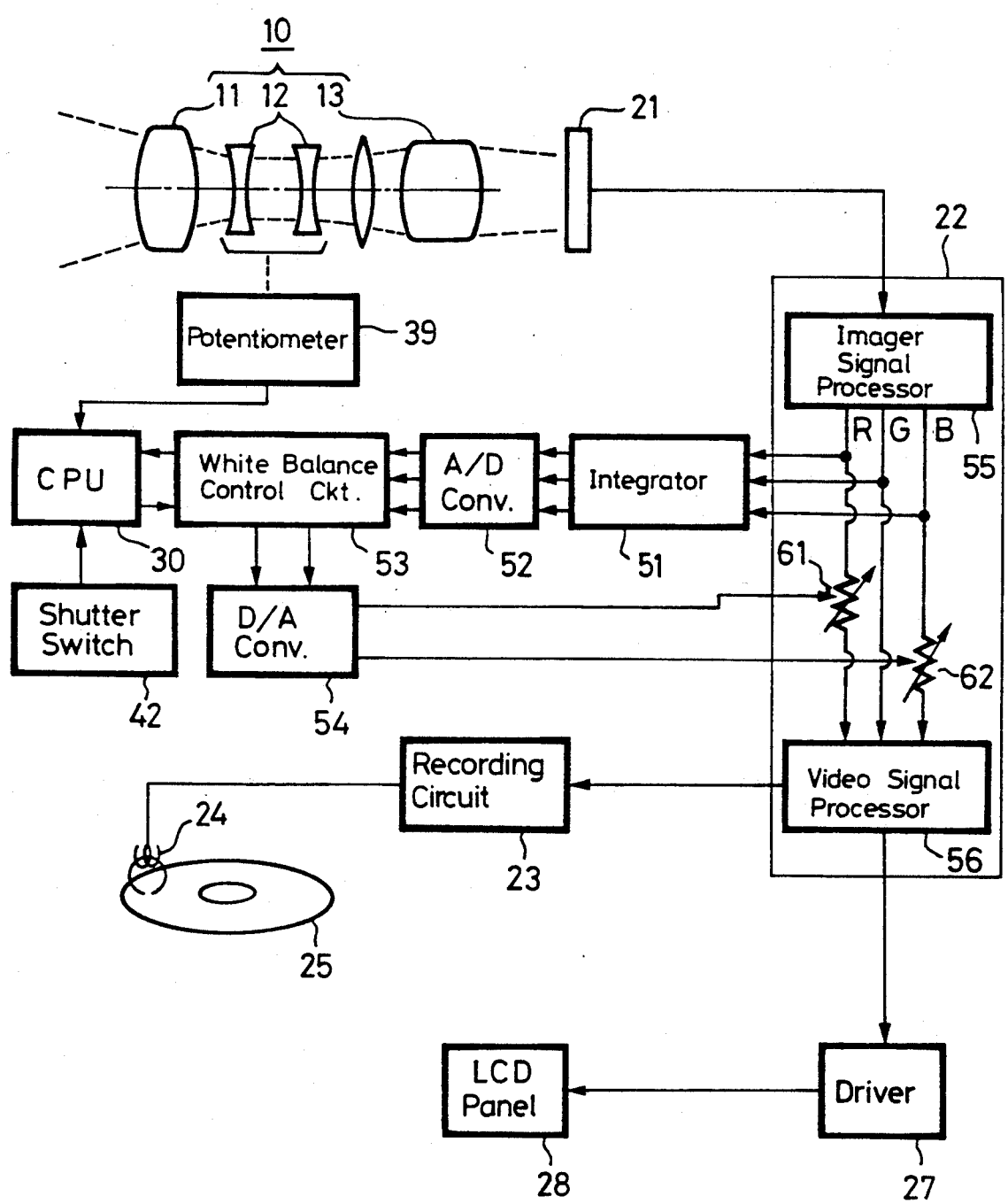
FIG. 5 is a schematic diagram showing a second embodiment of the still video camera according to the present invention.

FIG. 5 shows other embodiment of the present invention in which the idea of the present invention is applied to a white balance circuit. In FIG. 5, like parts corresponding to those of FIG. 1 are marked with the same references and therefore need not be described in detail.

Referring to FIG. 5, the imager signal from the solid state imager (i.e., CCD) 21 is converted into three primary color signals (red signal R, green signal G and blue signal B) by an imager signal processor circuit 55. Of the three primary color signals, the red signal R and blue signal B are respectively supplied to a video signal processor circuit 56 through variable resistors 61 and 62, which will be described later, and converted into a composite video signal of a predetermined format such as an NTSC system or the like by the video signal processor circuit 56. Then, the composite video signal from the video signal processor circuit 56 is supplied to the recording circuit 23 and a recording video signal of still image of one field (or one frame) processed in a predetermined manner by this recording circuit 23 is supplied to the magnetic head 24, thereby being recorded on a predetermined track on the magnetic disc 25.

The video signal from the video signal processor circuit 56 is supplied to a driver circuit 27 and a color liquid crystal display panel (color LCD panel) 28 constructing a electronic viewfinder is driven by this driver circuit 27. Accordingly, the image picked-up by the CCD imager 21 is displayed in color on the color LCD panel 28, and the thus picked-up color image is displayed on the color LCD panel 28 as a color moving image.

Further, the three primary color signals R, G and B from the imager signal processor circuit 55 are supplied to an integrating circuit 51 and the primary color signals of one picture amount (i.e., one field or one frame) are integrated by the integrating circuit 51. The resultant integrated values are supplied to and converted into digital data by an A/D converter 52 and the thus converted digital data are supplied to a white balance control circuit 53. Then, the white balance control circuit 53 determines whether or not a ratio of the respective integrated values of the primary color signals lies in a predetermined range, or whether or not the white balance is proper. That is, assuming that the ratio of the integrated values of the respective primary color signals of one picture amount becomes substantially similar to that of the imager signal of the white picture when the white balance is proper, then it is determined by the white balance control circuit 53 that the white balance is proper if the above ratio is similar to a ratio (ratio of red, green and blue signals is substantially 1:1:1) which is provided by the imager signal of white picture.

In this case, the white balance control circuit 53 is controlled in operation by the CPU 30 as will be described later and supplies, on the basis of the judged result of the white balance, a digital-to-analog (D/A) converter 54 with control data which are used to control gains of the red and blue signals R and B. Analog control data thus converted by the D/A converter 54 are supplied to the variable resistors 61 and 62. In the variable resistors 61 and 62, their resistance values are set on the basis of the control data supplied thereto from the white balance control circuit 53 and the red and blue signals R and B supplied from the imager signal processor circuit 55 side are supplied to the video signal processor circuit 56 as the gains based on the thus set resistance values.

Japanese Laid-Open Patent Publication No. 2-194792 describes a circuit which automatically adjusts white balance on the basis of the integrated values of the imager signal of one picture.

The above automatic white balance adjustment is not always carried out depending upon the image pickup mode. That is, if the image pickup mode of the electronic still camera determined by the CPU 30 is an image pickup mode in which a picture is taken while a color temperature is fixed, then the resistance values of the variable resistors 61 and 62 are respectively fixed to predetermined values. Alternatively, if the ratio of the integrated values of the respective primary color signals is considerably different from a predetermined ratio even when the automatic white balance adjustment is carried out, then it is determined that the cameraman takes a picture whose white balance cannot be adjusted automatically (e.g., image the whole surface of which is red), and on the basis of this judgement, the resistance values of the variable resistors 61 and 62 are not changed.

In FIG. 5, reference numeral 39 depicts a potentiometer for detecting the position of the zoom lens 12 which is employed as a focal length adjusting lens of the image pickup lens 10. Data detected by the potentiometer 39 is supplied to the CPU 30. Further, when the shutter button (switch) 42 is depressed, a corresponding control signal is supplied to the CPU 30 from the shutter switch 42.

In this embodiment, it is detected by the CPU 30 on the basis of the detected data from the potentiometer 39 that the zoom lens 12 is moved. Thus, when the movement of the potentiometer 12 is stopped, then the white balance control circuit 53 is energized while when it is detected by the CPU 30 that the shutter switch 42 is half pressed, then the white balance control circuit 53 is energized. This will be described with reference to a flowchart forming FIG. 6.

Figure 6:
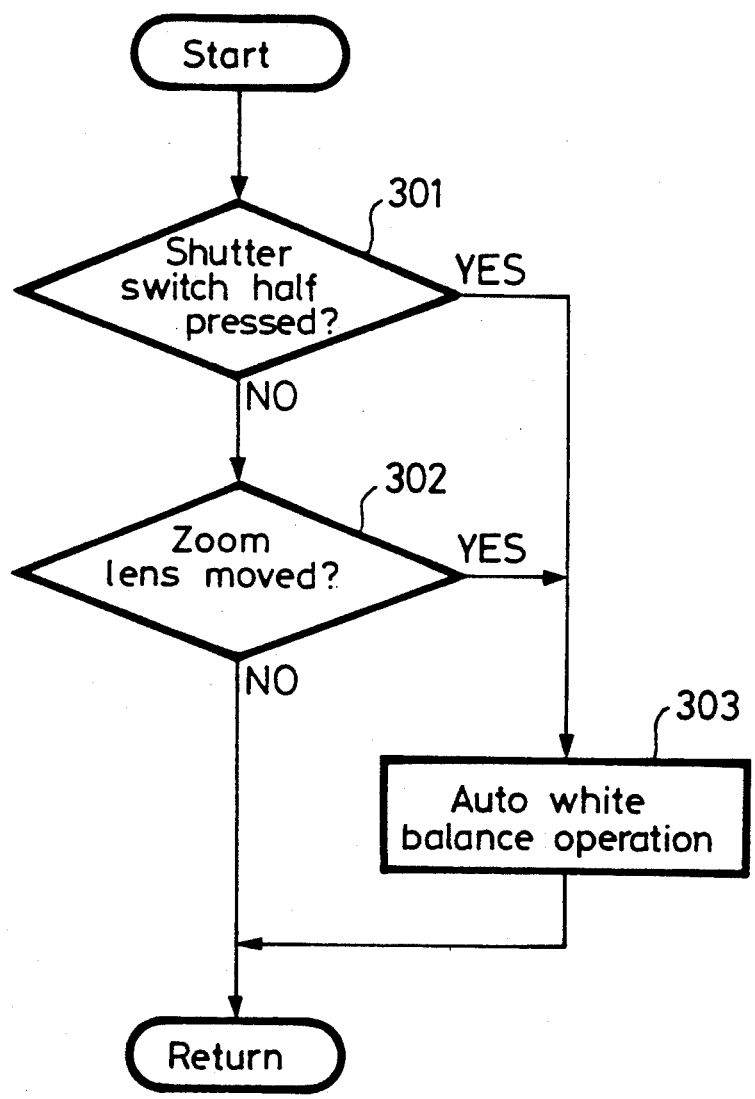
FIG. 6 is a flowchart to which references will be made in explaining white balance adjusting operation of the second embodiment according to the present invention.

Referring to FIG. 6, following the Start of operation, it is determined in decision step 301 by the CPU 30 whether or not the shutter switch 42 is half pressed. If a NO is an answer at decision step 301, then the processing proceeds to the next decision step 302. It is determined in decision step 302 by the CPU 30 whether or not the zoom lens 12 is moved and stopped. If a NO is output at decision step 302, then the processing proceeds to the return. On the other hand, if the shutter switch 42 is half pressed as represented by a YES at decision step 301 and also if the zoom lens 12 is moved and stopped as represented by a YES at decision step 302, then the processing proceeds to the next step 303. In step 303, the white balance control circuit 53 is energized so that the ratio of levels of the respective primary color signals R, G and B supplied to the video signal processor circuit 56 may fall in a predetermined range.

If the white balance control circuit 53 is not operated, then the integrating circuit 51, the A/D converter 52 and the D/A converter 54 are made inoperable by stopping the supply of power to these circuits 51, 52 and 54.

Since the electronic still camera of this embodiment is constructed as described above, the white balance can be adjusted at a good timing before the cameraman takes a picture. That is, the cameraman determines the angle of view by adjusting the focal length by moving the zoom lens 12 (i.e., a so-called framing is carried out) before taking a picture so that, when the zoom lens 12 is stopped moving after the setting of the angle of view is finished, then the CPU 30 energizes the white balance control circuit 53 to execute the automatic white balance adjustment. Accordingly, the cameraman determines the angle of view corresponding to the object before starting taking a picture, whereby the white balance is automatically adjusted so as to become proper just after the angle of view is determined. Thus, an object image whose white balance is proper is displayed on the color LCD panel 28 which constructs the electronic viewfinder. Then, the cameraman can judge an image to be taken on the basis of the object image displayed on the color LCD panel 28.

If the cameraman takes a picture without determining the angle of view (i.e., if the cameraman takes a picture without changing the focal length), then by half pressing the shutter switch 42 by the cameraman, the CPU 30 is energized to drive the white balance control circuit 53 similarly to the case such that the angle of view is determined, thereby the white balance being adjusted automatically.

Since the white balance is automatically adjusted before the cameraman takes a picture, the cameraman must at least determine the angle of view corresponding to the object and needs not any manipulation for executing the white balance adjustment. Thus, the cameraman can take a picture without complicated operation and a speedy shooting becomes possible. Further, after the angle of view corresponding to the object is determined, the object image whose white balance is properly adjusted is displayed on the electronic viewfinder so that the cameraman can readily judge the white balance adjusted state of the image to be taken by the display on the electronic viewfinder. Furthermore, since the white balance is automatically adjusted before the cameraman takes a picture only when the angle of view is determined or when the shutter switch is half pressed, a time for driving the circuit such as the white balance control circuit 53 or the like for adjusting the white balance can be suppressed to the minimum, which can reduce the power necessary for taking a picture.

While a white balance control circuit is formed as an open loop type in which the primary color signals supplied to the white balance control circuit 53 are employed as signals whose white balances are not yet adjusted in the above-mentioned embodiment, the white balance adjusting circuit may be formed as a closed loop arrangement in which the primary color signals supplied to the white balance adjusting circuit 53 are employed as signals whose white balances are already adjusted. In addition, the white balance control circuit 53 is not limited thereto and may be arranged as a white balance adjusting circuit of other construction.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. An electronic still camera comprising:
   a zoom lens for magnifying an optical image received at said zoom lens;
   a focusing lens for focusing said incident optical image;

a motor for driving said focusing lens;

a photo-electric converting unit for converting said optical image incident thereon through said zoom lens and said focusing lens into an electrical signal;

focus detecting means for detecting the focused state of said incident optical image; and zoom lens state detecting means for detecting the state of said zoom lens, wherein when the movement of said zoom lens is detected by said zoom lens state detecting means, said focusing lens is moved by said motor so as to focus said incident optical image on the basis of the detected result of said focus detecting means;

focusing lens position detecting means for detecting a position of said focusing lens and providing data indicative of the position; and memory means for storing the data indicative of the position of said focusing lens in which said optical image is focused relative to the position of said zoom lens, wherein said focusing detecting means is composed of a high frequency component detecting circuit for detecting a high frequency component of a video signal obtained from an output signal of said photo-electric converting unit and wherein when a high frequency component of level higher than a predetermined level is detected by said high frequency component detecting circuit and when the movement of said zoom lens from a first position representing a state of long focal length to a second position representing a state of short focal length is detected by said zoom lens state detecting means, data indicative of the focusing lens position corresponding to the zoom lens position detected by said zoom lens state detecting means is derived from said memory means and said focusing lens is moved to said focusing lens position to focus said optical image, while when the high frequency component of level higher than the predetermined level is not detected by said high frequency component detecting circuit and when the movement of said zoom lens is detected by said zoom lens state detecting means, the focusing position is detected on the basis of the video signal obtained from the output signal of said photo-electric converting unit so as to focus said optical image.

2. An electronic still camera comprising:

a zoom lens for magnifying an optical image received at said zoom lens;

a focusing lens for focusing said incident optical image;

a motor for driving said focusing lens;

a photo-electric converting unit for converting unit said optical image incident thereon through said zoom lens and said focusing lens into an electrical signal;

focus detecting means for detecting the focused state of said incident optical image; and zoom lens state detecting means for detecting the state of said zoom lens, wherein when the movement of said zoom lens is detected by said zoom lens state detecting means, said focusing lens is moved by said motor so as to focus said incident optical image on the basis of the detected result of said focus detecting means;

a focusing lens state detecting means for detecting the state of said focusing lens; and memory means for storing the focusing lens position at which said optical image is focused relative to the zoom lens position, wherein when the movement of said zoom lens from a first state of long focal length to a second state of short focal length is detected by said zoom lens state detecting means, data indicative of the focusing lens position corresponding to the zoom lens position detected by said zoom lens state detecting means is derived from said memory means and said focusing lens is moved to said focusing position by said motor so as to focus said optical image, while when the movement of said zoom lens from a second position to a first position is detected by said zoom lens state detecting means, said focusing lens is moved substantially to the intermediate position of the range of said focusing lens position corresponding to said first position by said motor so as to focus said optical image.

3. An electronic still camera comprising:

a zoom lens for magnifying an optical image incident on said zoom lens;

a focusing lens for focusing said optical image;

a motor for driving said focusing lens;

a photo-electric converting unit for converting said optical image incident thereon through said zoom lens and said focusing lens into an electrical signal;

focus detecting means for detecting the focused state of said incident optical image; and zoom lens state detecting means for detecting the state of said zoom lens, wherein when it is detected by said zoom lens state detecting means that said zoom lens is moved and then stopped, said focusing lens is moved by said motor so as to focus said incident optical image on the basis of the detected result of said focus detecting means;

focusing lens position detecting means for detecting the position of said focusing lens; and memory means for storing data indicative of the position of said focusing lens in which said optical image is focused relative to the position of said zoom lens, wherein said focusing detecting means is composed of a high frequency component detecting circuit for detecting a high frequency component of a video signal obtained from an output signal of said photo-electric converting unit and wherein when a high frequency component of level higher than a predetermined level is detected by said high frequency component detecting circuit and when the movement of said zoom lens from the first state of long focal length to the second state of short focal length is detected by said zoom leans state detecting means, data indicative of the focusing lens position corresponding to the zoom lens position detected by said zoom lens state detecting means is derived from said memory means and said focusing lens is moved to said focusing lens position to focus said optical image, while when the high frequency component of level higher than the predetermined level is not detected by said high frequency component detecting circuit and when the movement of said zoom lens is detected by said zoom lens state detecting means, the focusing position is detected on the basis of the video signal obtained from the output signal of said photo-electric converting unit so as to focus said optical image.

4. An electronic still camera comprising:

a zoom lens for magnifying an optical image incident on said zoom lens;
a focusing lens for focusing said optical image;
a motor for driving said focusing lens;
a photo-electric converting unit for converting said optical image incident thereon through said zoom lens and said focusing lens into an electrical signal;
focus detecting means for detecting the focused state of said incident optical image; and
zoom lens state detecting means for detecting the state of said zoom lens, wherein when it is detected by said zoom lens state detecting means that said zoom lens is moved and then stopped, said focusing lens is moved by said motor so as to focus said optical image on the basis of the detected result of said focus detecting means;
a focusing lens state detecting means for detecting the state of said focusing lens; and
memory means for storing the focusing lens position at which said optical image is focused relative to the zoom lens position, wherein when the movement of said zoom lens from a first state of long focal length to a second state of short focal length is detected by said zoom lens state detecting means, data indicative of the focusing lens position corresponding to the zoom lens position detected by said zoom lens state detecting means is derived from said memory means and said focusing lens is moved to said focusing lens position by said motor so as to focus said optical image, while when the movement of said zoom lens from a second position to a first position is detected by said zoom lens state detecting means, said focusing lens is moved substantially to the intermediate position of the range of said focusing lens position corresponding to said first position by said motor so as to focus said optical image.

* * * * *